United States Patent
Fujiwara

(10) Patent No.: US 8,710,363 B2
(45) Date of Patent: Apr. 29, 2014

(54) DYE-SENSITIZED SOLAR CELL, DYE-SENSITIZED SOLAR CELL MODULE, AND COATING LIQUID FOR FORMING ELECTROLYTE LAYER

(75) Inventor: Ryo Fujiwara, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/364,805

(22) Filed: Feb. 2, 2012

(65) Prior Publication Data

US 2012/0145216 A1 Jun. 14, 2012

Related U.S. Application Data

(63) Continuation of application No. PCT/JP2010/062399, filed on Jul. 23, 2010.

(30) Foreign Application Priority Data

Aug. 7, 2009 (JP) .................................. 2009-184892

(51) Int. Cl.
*H01L 31/00* (2006.01)

(52) U.S. Cl.
USPC ......................................................... 136/263

(58) Field of Classification Search
CPC ........................... H01G 9/2009; H01G 9/2013
USPC ......................................................... 438/85
See application file for complete search history.

(56) References Cited

U.S. PATENT DOCUMENTS

2002/0040728 A1* 4/2002 Yoshikawa ..................... 136/263
2006/0102869 A1* 5/2006 Cavaille et al. ............... 252/62.2
2008/0115824 A1* 5/2008 Kang et al. ..................... 136/247

FOREIGN PATENT DOCUMENTS

| GB | WO 2010103329 | * | 9/2010 | ..................... 427/58 |
| JP | 2005-294020 | | 10/2005 | |
| JP | 2006-086003 | | 3/2006 | |
| JP | 2007-035591 | | 2/2007 | |
| JP | 2007042531 A | | 2/2007 | |
| JP | 2007073234 A | | 3/2007 | |
| WO | WO 2010103329 A1 | * | 9/2010 | |

OTHER PUBLICATIONS

Chinese Office Action and Search Report (Chinese language only), Application No. 201080035077.2, dated Oct. 15, 2013 (6 pages).

(Continued)

*Primary Examiner* — Jeffrey T Barton
*Assistant Examiner* — Uyen Tran
(74) *Attorney, Agent, or Firm* — Robert P. Michal; Lucas & Mercanti, LLP

(57) ABSTRACT

An object of the present invention is to provide a dye-sensitized solar cell comprising a solid electrolyte and having excellent thermostability, which has the excellent feature of retaining liquid so as to prevent an electrolyte solution from being exuded even under high temperature or pressurized conditions, and a dye-sensitized solar cell module using the same. Such dye-sensitized solar cell comprises: an electrode base material 10; a porous semiconductor layer 20 formed on the electrode base material 10 having a porous surface carrying a sensitized dye; a counter electrode 40, which is disposed so as to face the porous semiconductor layer 20; and an electrolyte layer 30 comprising a redox pair and cationic cellulose or a derivative thereof, which is formed between the electrode base material 10 and the counter electrode 40.

6 Claims, 1 Drawing Sheet

(56) References Cited

OTHER PUBLICATIONS

Japanese Office Action and Search Report (Japanese language only), Application No. 201080035077.2, dated Oct. 15, 2013 (6 pages).
PCT International Preliminary Report on Patentability and English translation of the Written Opinion issued in related International Aplication PCT/JP2010/062399 (5 pages).
International Search Report issued Sep. 14, 2010 in related International Application PCT/JP2010/062399 (1 page).
Written Opinion issued Sep. 1, 2010 in related International Application PCT/JP2010/062399 (in Japanese) (3 pages).

* cited by examiner

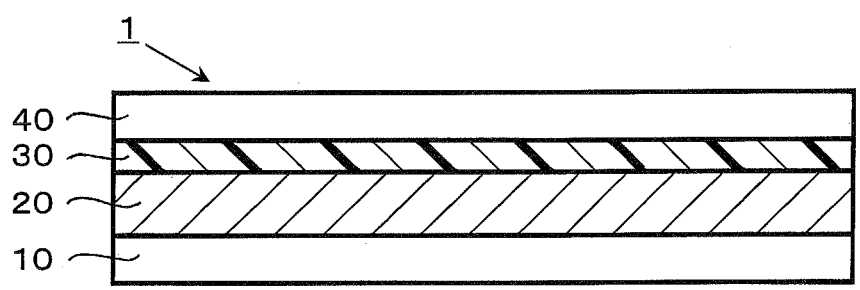

DYE-SENSITIZED SOLAR CELL, DYE-SENSITIZED SOLAR CELL MODULE, AND COATING LIQUID FOR FORMING ELECTROLYTE LAYER

CROSS-REFERENCE TO RELATED APPLICATIONS

This is a Continuation of PCT International Application PCT/JP2010/062399 filed Jul. 23, 2010, which in turns claims benefit of Japanese Patent Application 2009-184892 filed Aug. 7, 2009, the entire contents of each of which is incorporated herein by reference.

TECHNICAL FIELD

The present invention relates to a dye-sensitized solar cell, a solar cell module, and a coating liquid for forming an electrolyte layer of a solar cell.

BACKGROUND ART

In recent years, environmental issues such as global warming believed to be caused by an increase in $CO_2$ have become serious. Research and development of eco-friendly solar cells utilizing sunlight as a clean energy source have been actively conducted. Among such solar cells, dye-sensitized solar cells have been gaining attention as low-cost solar cells offering improved photoelectric conversion efficiency.

A dye-sensitized solar cell is formed by laminating, for example, a transparent substrate, a transparent electrode formed on the transparent substrate, an oxide semiconductor layer carrying a dye, an electrolyte layer containing an electrolyte, and a substrate on which a counter electrode has been formed, in such order from the light incidence side. In particular, Grätzel cells are characterized by a porous oxide semiconductor layer obtained by calcinating nanofine particles of titanium oxide. The use of a porous oxide semiconductor layer results in an increase in the amount of a sensitized dye to be adsorbed, thereby improving photoabsorption performance.

In a method for producing the above dye-sensitized solar cell, for example, a porous semiconductor layer comprising titanium oxide particles is formed in advance on a transparent electrode formed on the surface of a transparent substrate and a dye is carried on the porous semiconductor layer. Next, a counter electrode is coated with a catalyst made of a platinum film or the like. The semiconductor layer and the platinum film are layered such that they face to each other. An electrolyte is injected into the space therebetween to form an electrolyte layer. The sides of the space are sealed with an epoxy resin or the like. Thus, a dye-sensitized solar cell is produced.

Liquid electrolytes have been conventionally used for the electrolyte layer. Therefore, there is a risk of liquid leakage from the electrolyte layer. This causes reduction of photoelectric conversion efficiency, which is problematic. In order to solve such problem, dye-sensitized solar cells each comprising an electrolyte layer that has been solidified to prevent liquid leakage have been suggested.

Patent Literature 1 discloses a dye-sensitized solar cell having a solid layer comprising a work electrode having a dye-coated semiconductor film, a counter electrode that is disposed so as to face the work electrode, and a high-molecular porous film sandwiched between the work electrode and the counter electrode, in which an electrolyte solution is retained in a space in the solid layer.

In addition, Patent Literature 2 discloses a dye-sensitized solar cell having a redox electrolyte and a porous semiconductor layer in which a dye is adsorbed in a space between a transparent conductive film formed on a transparent substrate and a conductive substrate, in which the redox electrolyte is supported by a three-dimensionally crosslinked high-molecular compound.

In addition, Patent Literature 3 discloses a dye-sensitized solar cell comprising an electrode layer, a porous semiconductor layer adsorbing a dye, an electrolyte layer, and an electrode layer, which are formed between paired bases, in which the electrolyte layer comprises a solid electrolyte containing a molten salt (in the form of ionic liquid). This solar cell contains ionic liquid, making it possible to reduce the viscosity of the electrolyte and improve ion conductance so as to increase photoelectric conversion efficiency. In addition, Patent Literature 3 describes high-molecular compounds that can be used for the solid electrolyte, including poly(metha) acrylates and epoxy resins.

Further, Patent Literature 4 discloses a dye-sensitized solar cell having a structure obtained by allowing a porous oxide semiconductor film formed on a substrate to adsorb a dye to form a dye-sensitized semiconductor electrode and causing an organic medium in which an electrolyte has been dissolved to come into contact with the semiconductor electrode. The organic medium is solidified with the use of a natural polymer such as carrageenin or agalose, or a derivative thereof.

In the cases of the above conventional solar cells, a solidified film layer retains liquid and thus volatilization or leakage of the electrolyte solution can be prevented to some extent. However, when such cells are kept at particularly high temperatures of 100° C. or higher, the electrolyte solution is exuded from the polymer matrix in a time-dependent manner, making it difficult to maintain a solid form at high temperatures for long time. This has been problematic. In addition, if heat lamination is employed, solar cell production is carried out at high temperature of 130° C. to 150° C. However, such high temperature treatment further causes the electrolyte solution to be exuded. Accordingly, sufficient photoelectric conversion efficiency cannot be achieved, which is problematic.

CITATION LIST

Patent Literature

Patent Literature 1: JP Patent Publication (Kokai) No. 11-339866 A (1999)
Patent Literature 2: JP Patent Publication (Kokai) No. 2001-210390 A
Patent Literature 3: JP Patent Publication (Kokai) No. 2006-302531 A
Patent Literature 4: JP Patent Publication (Kokai) No. 2005-71688 A

SUMMARY OF INVENTION

Technical Problem

In view of the above circumstances, an object of the present invention is to provide a dye-sensitized solar cell comprising a solid electrolyte and having excellent thermostability, which has the excellent feature of retaining liquid so as to prevent an electrolyte solution from being exuded even under high temperature or pressurized conditions, and a dye-sensitized solar cell module using the same. Another object of the present invention is to provide a coating liquid for forming an electrolyte layer.

Solution to Problem

The present inventors found that the above problems can be solved by using, as a resin for an electrolyte layer, cationic cellulose such as cationized hydroxy alkylcellulose or a derivative thereof. This has led to the completion of the present invention. Specifically, the present invention can be summarized as below.

(1) A dye-sensitized solar cell, which comprises: an electrode base material; a porous semiconductor layer formed on the electrode base material having a porous surface carrying a sensitized dye; a counter electrode, which is disposed so as to face the porous semiconductor layer; and an electrolyte layer comprising a redox pair and cationic cellulose or a derivative thereof, which is formed between the electrode base material and the counter electrode.

(2) The dye-sensitized solar cell according to (1), wherein the cationic cellulose or a derivative thereof is cationized hydroxy alkylcellulose.

(3) The dye-sensitized solar cell according to (1) or (2), wherein the electrolyte layer further comprises ionic liquid.

(4) A dye-sensitized solar cell module, which is obtained by connecting a plurality of the dye-sensitized solar cells according to any one of (1) to (3) in series or in parallel.

(5) A coating liquid, which is a coating liquid used to form an electrolyte layer for a dye-sensitized solar cell and contains a redox pair, cationic cellulose or a derivative thereof, and water or an organic solvent.

(6) The coating liquid according to (5), wherein the cationic cellulose or a derivative thereof is cationized hydroxy alkylcellulose.

This description includes part or all of the contents as disclosed in the description and/or drawings of Japanese Patent Application No. 2009-184892, which is a priority document of the present application.

Advantageous Effects of Invention

Cationic cellulose or a derivative thereof is used in the present invention. Thus, a higher compatibility with and absorptivity of electrolyte solution can be obtained. Therefore, a dye-sensitized solar cell having excellent durability, from which such electrolyte solution is not exuded under high temperature or pressurized conditions, and a solar cell module using the same can be obtained. In addition, there is no need to use a sealing material for sealing an electrolyte layer, which is an essential member of a conventional cell. Therefore, dye-sensitized solar cell production cost can be reduced and the production procedure can be simplified.

DESCRIPTION OF EMBODIMENTS

FIG. 1 shows a cross-sectional view of the dye-sensitized solar cell of the present invention used in one embodiment.

DESCRIPTION OF EMBODIMENTS

The present invention is described detail in below.
FIG. 1 shows a cross-sectional view of the dye-sensitized solar cell of the present invention used in one embodiment. A dye-sensitized solar cell 1 is schematically illustrated as comprising: an electrode base material 10; a porous semiconductor layer 20, which is formed on the electrode base material 10 and has a porous surface carrying a sensitized dye; a counter electrode 40, which is disposed so as to face the porous semiconductor layer 20; and an electrolyte layer 30 comprising at least a redox pair and cationic cellulose or a derivative thereof, which is formed between the electrode base material 10 and the counter electrode 40. The use of cationic cellulose or a derivative thereof as a resin to be contained in the electrolyte layer makes it possible to improve a feature of retaining a redox pair, ionic liquid, and the like. This makes it possible to stabilize the electrolyte layer 30 so as to improve the photoelectric conversion efficiency of the dye-sensitized solar cell.

Next, individual members constituting a dye-sensitized solar cell 1 are described below.

(1) Electrode Base Material and Counter Electrode

As an electrode base material 10 and a counter electrode 40, a general electrode such as a different type of metal foil or metal plate can be used. Alternatively, the electrode can be obtained by, for example, forming an electrode layer on the surface of a glass or plastic substrate. A substrate may be transparent or nontransparent. However, if one side of the electrode layer is designated as a light-receiving face, a transparent substrate with excellent light permeability is preferably used. Further, such substrate preferably has excellent thermostability, weatherability, and gas barrier capacity against water vapor and the like. Specific examples of a substrate include: nonflexible and transparent rigid materials such as silica glass, Pyrex (registered trademark), and synthetic silica glass; and plastic films such as ethylene-tetrafluoroethylene copolymer film, biaxially-oriented polyethylene terephthalate film, polyether sulfone film, polyether ether ketone film, polyether imide film, polyimide film, and polyethylene naphthalate (PEN) film. In the present invention, it is preferable to use an electrode base material consisting of a flexible film obtained by forming an electrode layer with the use of a plastic film selected from the above examples as a substrate. Accordingly, a solar cell that can be used for various applications can be obtained. In addition, solar cell weight reduction and production cost reduction can be achieved. Here, a single-layer plastic film can be used as a substrate. Alternatively, a laminate of at least two different plastic films can be used.

The thickness of the substrate for each of the electrode base material and the counter electrode is preferably 15 µm to 500 µm.

A material for the electrode layer formed on the substrate is not particularly limited as long as it has excellent conductivity. However, if one side of an electrode layer is designated as a light-receiving face, an electrode layer preferably has excellent light permeability. For example, examples of a material having excellent light permeability include $SnO_2$, ITO, IZO, and ZnO. Of these, fluorine-doped $SnO_2$ or ITO is particularly preferable because it has excellent conductivity and permeability.

In addition, it is preferable to select a material for the electrode layer for each of the electrode base material and the counter electrode depending on the work function of the material. For example, examples of a material having a high work function include Au, Ag, Co, Ni, Pt, C, ITO, $SnO_2$, and fluorine-doped $SnO_2$ or ZnO. Meanwhile, examples of a material having a low work function include Li, In, Al, Ca, Mg, Sm, Tb, Yb, and Zr.

In addition, each electrode layer may be composed of a single layer. Alternatively, it may be composed of a laminate of materials having different work functions.

The film thickness of the electrode layer is 0.1 nm to 500 nm and preferably 1 nm to 300 nm.

A method for forming such electrode layer is not particularly limited. However, examples thereof include a vapor deposition method, a sputtering method, and a CVD method. Of these, a sputtering method is preferably used.

In addition, a catalyst layer is further formed on the electrode layer on the counter electrode side. Thus, the power generation efficiency of a dye-sensitized solar cell can be improved. Examples of the catalyst layer include, but are not limited to, a layer upon which Pt has been deposited and a catalyst layer comprising an organic substance such as polyaniline, polythiophene, or polypyrrole.

(2) Porous Semiconductor Layer

Next, a porous semiconductor layer 20 is described. The porous semiconductor layer contains metal oxide semiconductor particles carrying a sensitized dye. Thus, it has a function of conducting charges generated by the sensitized dye upon light irradiation.

Metal oxide semiconductor particles have porous surfaces on which a sensitized dye is carried and thus they are preferably porous particles having continuous holes. The presence of such porous particles results in an increase in the surface area of a porous semiconductor layer, allowing a sufficient amount of a sensitized dye to be carried. Also, the area for contact between the porous semiconductor layer and the electrolyte layer described below can be increased. This enables the improvement of energy conversion efficiency.

The film thickness of a porous semiconductor layer is 1 μm to 100 μm and preferably 5 μm to 30 μm. This is because when it falls within this range, film resistance of the porous semiconductor layer can be reduced. In addition, the porous semiconductor layer can achieve photoabsorption to a sufficient extent.

Metal oxide semiconductor particles forming a porous semiconductor layer are not particularly limited as long as the metal oxide can conduct charges generated by a sensitized dye to the electrode layer of an electrode base material 10. Specific examples of such metal oxide include $TiO_2$, ZnO, $SnO_2$, ITO, $ZrO_2$, $SiO_2$, MgO, $Al_2O_3$, $CeO_2$, $Bi_2O_3$, $Mn_3O_4$, $Y_2O_3$, $WO_3$, $Ta_2O_5$, $Nb_2O_5$, and $La_2O_3$. Metal oxide semiconductor particles of a single type of metal oxide can be used. Alternatively, metal oxide semiconductor particles of two or more types of metal oxides can be mixed and used. In particular, $TiO_2$ can be preferably used. Further, a core shell structure may be formed by covering core particles of one of the above metal oxides with different metal oxide semiconductor particles to form shells.

The content of metal oxide semiconductor particles in a porous semiconductor layer is 40% by weight to 99.9% by weight and preferably 85% by weight to 99.5% by weight.

In addition, particle sizes of metal oxide semiconductor particles range from 1 nm to 10 μm and preferably 10 nm to 500 nm. If particle sizes fall below the above range, it becomes difficult to produce the above particles. In this case, it would be probable that particle aggregation would take place, disadvantageously resulting in secondary particle formation. Meanwhile, if particle sizes fall above the aforementioned range, the thickness of a porous semiconductor layer increases, disadvantageously resulting in increased resistance.

In addition, metal oxide semiconductor particles of metal oxide of the same or different species having different particle sizes can be mixed and used. Accordingly, light scattering effects can be enhanced. This allows intensified light gathering inside a porous semiconductor layer. Therefore, photoabsorption by a sensitized dye can efficiently take place. For example, 10-nm to 50-nm metal oxide semiconductor particles and 50-nm to 200-nm metal oxide semiconductor particles can be mixed and used.

A sensitized dye carried by metal oxide semiconductor particles is not particularly limited as long as it absorbs light so as to generate electromotive force. Specific examples thereof include an organic dye and a metal complex dye. Examples of an organic dye include acridine dyes, azo dyes, indigo dyes, quinone dyes, coumarin dyes, merocyanine dyes, phenylxanthene dyes, indoline dyes, and squarylium dyes. Particularly preferably, coumarin dyes are used.

In addition, examples of a metal complex dye that can be preferably used include ruthenium dyes, and particularly preferably, rutheniumbipyridine dyes and rutheniumterpyridine dyes. Such sensitized dye is carried on the porous surfaces of metal oxide semiconductor particles, thereby allowing efficient absorption of light including visible light for photoelectric conversion.

A method for forming a porous semiconductor layer is not particularly limited. However, it is preferable to form a porous semiconductor layer by a coating method. Specifically, a coating liquid is prepared by dispersing metal oxide semiconductor particles in a medium using a known disperser such as a homogenizer, a ball mill, a sand mill, a roll mill, or a planetary mixer. The coating liquid is applied to the electrode layer of an electrode base material 10, followed by drying. If necessary, further calcination is carried out. Then, a sensitized dye is adsorbed to the surfaces of metal oxide semiconductor particles. Thus, a porous semiconductor layer carrying, a sensitized dye can be formed.

A medium used for a coating liquid containing metal oxide semiconductor particles is not particularly limited. Specific examples thereof include: a chlorinated medium comprising chloroform, methylene chloride, dichloroethane, or the like; an ether medium comprising tetrahydrofuran or the like; an aromatic hydrocarbon medium comprising toluene, xylene, or the like; a ketone medium comprising acetone, methylethylketone, or the like; an ester medium comprising ethyl acetate, butyl acetate, ethyl cellosolve acetate, or the like; an alcohol medium comprising isopropyl alcohol, ethanol, methanol, butyl alcohol, or the like; and other mediums comprising N-methyl-2-pyrrolidone, pure water, and the like.

In addition, if necessary, a variety of additives can be used to improve coating adequacy of a coating liquid used for formation of a porous semiconductor layer. Examples of additives include a surfactant, a viscosity modifier, a dispersion aid, and a pH adjuster. Examples of a pH adjuster include nitric acid, hydrochloric acid, acetic acid, and ammonia.

A method for applying a coating liquid containing metal oxide semiconductor particles is not particularly limited as long as it is a known coating method. Specific examples of such coating include dye coating, gravure coating, gravure reverse coating, roll coating, reverse roll coating, bar coating, blade coating, knife coating, air-knife coating, slot dye coating, slide dye coating, dip coating, microbar coating, microbar reverse coating, and screen printing. Coating and drying are carried out alternately once or a plurality of times by such coating method. Thus, a porous semiconductor layer is formed by adjusting the film thickness to a desired level.

After coating and drying, calcination is carried out according to need. Accordingly, homogenization and density growth of a porous semiconductor layer can be achieved, resulting in an increase in the degree of binding between metal oxide semiconductor particles. Therefore, charge conductance can be improved. In addition, the adhesion between an electrode base material and a porous semiconductor layer can be improved. The temperature and time for calcination may differ depending on the porous semiconductor layer film thickness and the like without limitation. However, the temperature and time are generally approximately 300° C. to 700° C. for approximately 5 minutes to 120 minutes. In addition, if an electrode base material is made of a flexible film, drying/calcination is preferably carried out below the thermostable temperature of the film.

For example, a method for allowing a porous semiconductor layer to carry a sensitized dye is a method comprising immersing dried/calcinated metal oxide semiconductor particles in a solution containing a sensitized dye followed by dring or a method comprising applying a solution containing a sensitized dye to metal oxide semiconductor particles for permeation followed by drying. A medium used for a solution containing a sensitized dye is appropriately selected from among aqueous media and organic media depending on the type of dye sensitizer to be used.

(3) Electrolyte Layer

Next, an electrolyte layer 30 is described. An electrolyte layer 30 is formed between an electrode base material 10 and a counter electrode 40. It comprises at least a redox pair and cationic cellulose or a derivative thereof. It further comprises ionic liquid according to need. The electrolyte layer is in the solid form. Thus, durability and stability of a dye-sensitized solar cell can be improved.

A redox pair can be adequately selected from among redox pairs generally used in electrolyte layers. Specifically, a redox pair comprising iodine or a redox pair comprising bromine is preferably used. Examples of a redox pair comprising iodine include combinations of iodine and iodide such as lithium iodide, sodium iodide, potassium iodide, calcium iodide, or TPAI (tetrapropyl ammonium iodide). In addition, examples of a redox pair comprising bromine include combinations of bromine and bromide such as lithium bromide, sodium bromide, potassium bromide, or calcium bromide.

The redox pair concentration in the electrolyte layer 30 also can vary depending on the type of redox pair and thus is not particularly limited. However, when an iodine or bromine redox pair is used, it is preferable to adjust the iodine or bromine concentration to 0.01 mol/l to 0.5 mol/l and the iodide or bromide concentration to 0.1 mol/l to 5 mol/l. In general, the molar ratio of iodine or bromine to iodide or bromide is adjusted to about 1:10.

An ionic liquid (room-temperature molten salt) is used according to need, which can reduce electrolyte viscosity and improve ion conductance so as to enhance photoelectric conversion efficiency. The ionic liquid vapor pressure is extremely low and thus an ionic liquid substantially does not evaporate at room temperature. There is no need to worry about the risk of volatilization or ignition associated with the use of general organic solvents. Therefore, reduction of cell performance due to volatilization can be prevented.

Examples of such ionic liquid include: an imidazolium-based ionic liquid containing, as a cation, 1-methyl-3-methylimidazolium, 1-butyl-3-methylimidazolium, 1-hexyl-3-methylimidazolium, 1-octyl-3-methylimidazolium, 1-octadecyl-3-methylimidazolium, 1-methyl-2,3-dimethylimidazolium, 1-butyl-2,3-dimethylimidazolium, 1-hexyl-2,3-dimethylimidazolium, 1-octyl-2,3-dimethylimidazolium, or 1-octadecyl-2,3-dimethylimidazolium; a pyridium-based ionic liquid containing, as a cation, 1-methyl-pyridium, 1-butyl-pyridium, or 1-hexyl-pyridium; an alicyclic amine-based ionic liquid; an aliphatic amine-based ionic liquid; a fluorine-based ionic liquid containing, as an anion, iodine ion, bromine ion, chlorine ion, tetrafluoro borate, hexafluoro borate, trifluoromethanesulfonate, or trifluoroacetate; a cyanate-based ionic liquid; and a thiocyanate-based ionic liquid. Such substances may be used alone or in combination of two or more.

Particularly preferably, an iodide-based ionic liquid containing, as an anion, iodine is used. Specific examples thereof include 1,2-dimethyl-3-n-propylimidazolium iodide, 1-methyl-3-n-propylimidazolium iodide, 1-propyl-3-methylimidazolium iodide, 1-butyl-2,3-dimethylimidazolium iodide, and 1-hexyl-3-methylimidazolium iodide. Such iodide-based ionic liquid can function as an iodine ion supply source and also can function to form a redox pair.

The ionic liquid concentration in the electrolyte layer can vary depend on the type of ionic liquid and the like. However, the concentration of ionic liquid in the electrolyte layer 30 is preferably 0% to 80% by weight and particularly preferably 30% to 70% by weight. An ionic liquid that also can function to form a redox pair, such as an iodide-based ionic liquid, is contained in the electrolyte layer so as to form a redox pair. The ionic liquid concentration is preferably adjusted to the concentration described above in terms of a redox pair. Specifically, the ionic liquid concentration in the electrolyte layer 30 is preferably 0.1 mol/l to 5 mol/l. In such case, the above redox pair does not necessarily contain a different type of iodide, in addition to the iodide-based ionic liquid. As a result, the total concentration of iodide that can function to form a redox pair may be 0.1 mol/l to 5 mol/l.

Moreover, the present invention is characterized in that the electrolyte layer 30 contains cationic cellulose or a derivative thereof. Here, the term "cationic cellulose or a derivative thereof" refers to a cationized product obtained by allowing a cationization agent to react with OH groups of a cellulose or a derivative thereof. The electrolyte layer contains cationic cellulose or a derivative thereof. Thus, a solid electrolyte having excellent durability/thermostability, which has the excellent feature of retaining liquid so as to prevent an electrolyte solution from being exuded even under high temperature or pressurized conditions, can be obtained. Further, since the electrolyte solution is not exuded from the solid, it is not necessary to use a sealing material, which is conventionally an essential material for sealing an electrolyte layer inside a cell. Therefore, solar cell production cost can be reduced and the production procedure can be simplified. These effects can probably be obtained because of the following reasons. An electrolyte solution used in a dye-sensitized solar cell is mainly formed with a medium (e.g., an organic solvent or an ionic liquid), an iodine salt ($I^-$ or $I_3^-$), and the like so that it becomes anionic. Therefore, compatibility with an electrolyte solution and the adsorbability of an electrolyte solution can be improved using cationized cellulose or a derivative thereof.

Examples of cellulose to be catioinized or a derivative thereof include: cellulose; alkylcellulose such as methylcellulose, or ethylcellulose; hydroxy alkylcellulose such as hydroxy methylcellulose, hydroxy ethylcellulose, or hydroxy propylcellulose; and hydroxy alkylalkylcellulose, in which an OH group of cellulose has been substituted with an alkoxy group or a hydroxy alkoxy group, such as hydroxy ethylmethylcellulose, hydroxy propylmethylcellulose, or hydroxy ethylethylcellulose. Of these, hydroxy alkylcellulose such as hydroxy ethylcellulose can be preferably used.

As a cationization agent, a substance having a group that reacts with an OH group of cellulose or a derivative thereof and a cation portion of a quaternary ammonium group or the like can be used. A group that reacts with an OH group is not particularly limited as long as it is a reaction group that forms a covalent bond with an OH group. Examples thereof include an epoxy group, a halohydrin group, a halogen group, a vinyl group, and a methylol group. In view of reactivity, an epoxy group and a halohydrin group are particularly preferable. In addition, a quaternary ammonium group has a —$N^+R_3$ structure (where R represents an alkyl group, an aryl group, or a heterocyclic group that may optionally have a substitution group). Preferable examples of such cationization agent include glycidyltrialkyl ammonium halide such as glycidyltrimethyl ammonium chloride or 3-chloro-2-hydroxy propyltrimethyl ammonium chloride, and a halohydrin form thereof.

For instance, a preferable example of cationic cellulose or a derivative thereof is ether obtained by reacting hydroxy ethylcellulose and 3-chloro-2-hydroxy propyltrimethyl ammonium chloride used as a cationization agent. In the case of such cationic cellulose derivative, hydrogen atoms of three OH groups of cellulose are partially substituted with a hydroxy ethyl group (—$CH_2CH_2OH$). The degree of substituion (substituion degree: m) is 1 to 3 (that is to say, 1 to 3 OH groups in a cellulose repeat unit are substituted) and preferably approximately 1.3.

In addition, the rate of cationization induced by a cationization agent (that is to say, the percentage of —$CH_2CH_2OH$ groups cationized with a quaternary ammonium salt among the all —$CH_2CH_2OH$ groups of hydroxy ethylcellulose in the above cationic cellulose derivative) can vary depending on the molecular weight of cellulose, the amount/type of redox pair, and the like, and it is not particularly limited. However, it is preferably 20% to 50% and more preferably 30% to 40%. Similarly, the degree of substitution (m) and the percentage of —$CH_2CH_2OH$ groups to be cationized also can apply to other cationic cellulose derivatives, in addition to the above cationized hydroxy ethylcellulose.

The molecular weight of cationic cellulose or a derivative thereof can vary depending on the type thereof, and thus it is not particularly limited. For example, if the aforementioned cationic hydroxy ethylcellulose is used as cationic cellulose or a derivative thereof, cationic cellulose or a derivative thereof is dissolved in water to result in a concentration of 2% by weight, followed by viscosity measurement at 30° C. In this case, the molecular weight corresponds to a viscosity of preferably 100 to 200 mPa·s.

If the concentration of cationic cellulose or a derivative thereof in an electrolyte layer 30 is excessively low, the durability or thermostability of the electrolyte layer decreases. On the other hand, if it is excessively high, the photoelectric conversion efficiency of a solar cell decreases. Therefore, the concentration is appropriately determined in view of the above. Specifically, the concentration in the electrolyte layer 30 is preferably 10% to 50% by weight.

Production of the above cationic cellulose or a derivative thereof can be carried out by a general method. Specifically, a cationization agent and an alkali metal hydroxide used as a catalyst are allowed to act on cellulose or a derivative thereof. It is possible to use, as a reaction medium, water, lower alcohol (such as methanol, ethanol, n-propyl alcohol, isopropyl alcohol, n-butanol, or t-butanol), or a mixed medium containing water and lower alcohol at an amount 8 to 15 times greater than the weight of cellulose or a derivative thereof. Examples of alkali metal hydroxide include sodium hydroxide and potassium hydroxide. In addition, the amounts of a cationization agent and a catalyst can vary depending on the medium composition in a reaction system, mechanical conditions of a reactor, and other factors. However, the amounts can be adequately adjusted such that the percentage of —$CH_2CH_2OH$ groups to be cationized in the above cellulose or a derivative thereof reaches a desired level.

In addition, a cellulose derivative such as alkylcellulose or hydroxy alkylcellulose can be obtained by, for example, a method comprising subjecting cellulose to alkali treatment and adding a halogenated alkane such as methyl chloride, alkylene oxide, or the like.

An alkali hydroxide metal salt remaining after the reaction with a cationization agent is neutralized with mineral acid or organic acid, followed by washing with an organic solvent such as isopropyl alcohol or acetone, purification, and drying in an adequate manner. Thus, a cationic cellulose derivative can be obtained. If the dried product is in the form of a block object as a result of aggregation, it is disrupted into a powder using a hammer mill or the like. Thus, handleability for use can be improved.

In addition, the electrolyte 30 may contain an additional resin that can be mixed with the above cationic cellulose or a derivative thereof according to need. In general, if a flexible plastic film is used as a substrate for an electrode base material 10 and a counter electrode 40, short-circuiting might take place when, for example, a solar cell is folded. This is problematic. In the case of the electrolyte layer containing cationic cellulose or a derivative thereof of the present invention, it is possible to prevent an electrolyte solution from being exuded under high temperature conditions. However, the electrolyte layer tends to be adhesive. In particular, there is concern that short-circuiting might take place. Thus, an additional resin having shape stability is used in addition to cationic cellulose or a derivative thereof, thereby making it possible to effectively prevent short-circuiting. Here, the term "resin having shape stability" refers to a resin characterized in that a layer comprising the resin formed on a glass substrate or the like can be detached in film form from the substrate by pinching the layer with forceps. In addition, such resin is characterized in that an electrolyte layer 30 can be formed with the resin to an extent such that short-circuiting is not induced when a solar cell comprising the electrolyte layer is folded.

It is possible to use, as such additional resin, a resin appropriately selected from among conventionally known resins in consideration of the compatibility with cationic cellulose or a derivative thereof and the like. Specific examples thereof include polyvinylidene fluoride, polyvinylidene fluoride-hexafluoropropylene copolymer, polyvinyl alcohol, polyvinyl acetate, polyvinyl pyrrolidone, acrylic resins (e.g., PMMA and styrene-acryl copolymers), cellulose derivatives (e.g., ethylcellulose, cellulose acetate butyrate, cellulose acetate propylate, and cellulose acetate), SBR, and urethane resins.

The concentration of the additional resin in the electrolyte layer 30 can be appropriately determined in consideration of the balance between the amount of the resin and the amount of the cationic cellulose or a derivative thereof. Specifically, it is preferable that the total amount of the cationic cellulose or a derivative thereof and the additional resin correspond to 10% to 50% of the weight of the electrolyte layer 30. In such case, the amount of the cationic cellulose or a derivative thereof corresponds to preferably 5% to 50% of the weight of the electrolyte layer 30. In addition, the weight ratio of the additional resin to the cationic cellulose or a derivative thereof (additional resin: cationic cellulose or a derivative thereof) can vary depending on the type of resin. However, in general, it is preferably 1:0.6 to 1:2.

Further, the electrolyte layer 30 may contain, if necessary, metal oxide particles, in addition to the aforementioned redox pair, ionic liquid, cationic cellulose or a derivative thereof, and additional resin. The ionic liquid and the like can be retained in the presence of metal oxide particles. In addition, it is possible to prevent an electrolyte solution from being exuded from a solid electrolyte under high temperature conditions.

Examples of metal oxide particles include titanium oxide, zinc oxide, cerium oxide, iron oxide, silica, alumina, and ITO particles and combinations of two or more thereof. In particular, fine particles of silica are preferably used because they have light resistance and high stability.

The metal oxide particle size is not particularly limited as long as metal oxide particles have excellent miscibility with an electrolyte solution and the particle size is not greater than the size of the cell gap. In general, if it is excessively large, the photoelectric conversion efficiency of the solar cell decreases. On the other hand, if it is excessively small, the electrolyte solution retention capacity decreases in some cases. The particle size is appropriately determined in consideration of good balance of photoelectric conversion efficiency and electrolyte solution retention capacity. Specifically, the particle size is preferably 7 nm to 100 µm. In addition, particles may be, for example, spherical or whisker-shaped particles.

If the content of metal oxide particles in the electrolyte layer 30 is excessively high, the photoelectric conversion efficiency of the solar cell decreases. The content is appropriately determined in consideration of this. Specifically, the content of metal oxide particles is preferably 20 parts by weight or less when electrolyte layer excluding the metal oxide particles is designated as 100 parts by weight.

In addition to the above, the electrolyte layer 30 may contain a variety of additives for improving durability, open voltage, and the like. Examples of additives include guanidium thiocyanate, tertiary butylpyridine, and N-methylbenzimidazole. The sum of the concentrations of these additives contained in the electrolyte layer is preferably 1 mol/l or less.

The film thickness of the electrolyte layer 30 including the film thickness of the porous semiconductor layer 20 is preferably 2 µm to 150 µm and particularly preferably 10 µm to 50 µm. If the film thickness excessively decreases, a porous semiconductor layer comes into contact with a counter electrode, which might cause short-circuiting. On the other hand, if the film thickness excessively increases, it causes an increase in internal resistance, disadvantageously resulting in performance reduction.

Examples of a method for forming an electrolyte layer 30 include: a method for forming an electrolyte layer by applying a coating liquid for forming an electrolyte layer to a porous semiconductor layer 20 followed by drying (hereinafter referred to as an coating method); and a method for forming an electrolyte layer by arranging a porous semiconductor layer 20 and a counter electrode 40 in a manner such that an appropriate space is formed therebetween and injecting a coating liquid into the space (hereinafter referred to as an injection method).

A medium for a coating liquid can be adequately selected depending on the type of cationic cellulose or a derivative thereof and the like. Specific examples of a medium that can be preferably used include: organic solvents (an alcohol solvent such as ethanol, a ketone solvent such as methylethylketone, and an amide solvent such as N-methylpyrrolidone), and pure water. In particular, in view of coating liquid stability and electrolyte film formation, it is preferable to use an organic solvent in which cationic cellulose or a derivative thereof and ionic liquid are soluble. In this regard, water or an organic solvent such as an alcohol solvent (e.g., ethanol) is preferably used.

According to the coating method, a general means can be used as a means of applying a coating liquid to a porous semiconductor layer 20. Specific examples of such coating include dye coating, gravure coating, gravure reverse coating, roll coating, reverse roll coating, bar coating, blade coating, knife coating, air-knife coating, slot dye coating, slide dye coating, dip coating, microbar coating, microbar reverse coating, and screen printing. After coating, the medium is removed by adequate drying. Thus, the electrolyte layer can be formed.

The coating liquid may contain, as an additive, a crosslinking agent, a photopolymerization initiator, or the like according to need. The coating liquid is applied to a porous semiconductor layer, followed by light irradiation. Thus, an electrolyte layer can be cured.

One face of the counter electrode 40 corresponding to the electrode layer side is attached to the thus formed electrolyte layer 30. Thus, the dye-sensitized solar cell of the present invention can be obtained.

If the electrolyte layer 30 is formed by an injection method, counter electrode 40 on which an electrode layer has been formed is prepared in advance. The electrolyte layer is disposed such that a porous semiconductor layer 20 and a counter electrode 40 are disposed to allow an appropriate space to be formed therebetween. It is preferable to form a space so as to result in a distance between the electrode base material 10 and the counter electrode 40 of 2 µm to 150 µm. It is possible to provide a spacer on the side of the electrode base material 10 or the side of the counter electrode 40 in order to dispose the counter electrode 40 by forming an appropriate space. Examples of such spacer include glass spacers and resin spacers known in the art.

Next, a coating liquid used for forming an electrolyte layer is injected into the space using capillary action or the like, followed by temperature adjustment and ultraviolet irradiation, electron beam irradiation, or the like for curing. Thus, an electrolyte layer 30 can be formed. Accordingly, the dye-sensitized solar cell can be obtained.

Further, a plurality of dye-sensitized solar cells 1 obtained as described above are connected in series or in parallel. Thus, a dye-sensitized solar cell module can be obtained. Specifically, for example, a plurality of dye-sensitized solar cells are arranged on a plane or a curved surface. A nonconductive partition is provided between each two cells to separate off the cells. The cells are electrically connected using a conductive member. Then, a positive or negative electrode lead can be pulled out from one end of each cell for formation of a module. The number of dye-sensitized solar cells constituting a module can be arbitrary determined and thus a module can be freely designed to achieve a desired voltage.

EXAMPLES

The present invention is hereafter described in greater detail with reference to the Examples and the Comparative examples, although the present invention is not limited thereto.

Example 1

An electrolyte solution was prepared by dissolving hexylmethylimidazolium iodide (Tomiyama Pure Chemical Industries, Ltd.) (6 mol/l), iodine (Merck) (0.6 mol/l), N-methylbenzimidazole (Aldrich) (0.45 mol/l), and guanidium thiocyanate (Aldrich) (0.1 mol/l) in ethylmethylimidazoliumthiocyanate (Merck).

Subsequently, a resin solution was prepared by dissolving cationic hydroxy ethylcellulose (Daicel Corporation; m=1.3; cationization percentage: 35% of —CH$_2$CH$_2$OH groups) cationized with 3-chloro-2-hydroxy propyltrimethyl ammonium chloride in pure water so as to result in a cationic hydroxy ethylcellulose concentration of 5% by weight.

Then, the above electrolyte solution and the above resin solution were mixed at a weight ratio of 1:6. The mixture was sufficiently kneaded. Thus, a coating liquid A for forming an electrolyte layer was obtained.

Next, Ti Nanoxide D/SP (Solaronix; a paste containing titanium oxide at approximately 20% by weight) was applied to a fluorine-doped tin oxide-coated glass substrate (Nippon Sheet Glass Co., Ltd.) by a screen printing method so as to result in a film thickness of 10 µm. Thus, a metal oxide semiconductor particle layer was formed. Thereafter, the glass substrate was heated at 500° C. for 30 minutes.

After cooling, an adsorption dye solution was prepared by dissolving, as a sensitized dye, a ruthenium complex (Solaronix; N719) in an anhydrous ethanol solution so as to result in a concentration of $3 \times 10^{-4}$ mol/l. The above glass substrate on which a metal oxide semiconductor particle layer had been formed was immersed in the solution for 24 hours so as to allow the metal oxide semiconductor particles on the substrate to carry the sensitized dye. Thus, a porous semiconductor layer was formed.

The aforementioned coating liquid for forming an electrolyte layer was applied using an applicator to the thus formed porous semiconductor layer such that the total thickness including the thickness of the porous semiconductor layer reached 55 µm, followed by drying at 120° C. for 15 minutes. Thus, a solid electrolyte layer was formed.

As a counter electrode, a fluorine-doped tin oxide-coated glass substrate (Nippon Sheet Glass Co., Ltd.) was prepared via platinum sputtering. The substrate was attached to the electrolyte layer. Thus, a dye-sensitized solar cell was produced.

Example 2

A coating liquid B for forming an electrolyte layer was prepared in the manner used in Example 1 except that glycidyltrimethyl ammonium chloride was used as the cationization agent. The coating liquid B was applied to a porous semiconductor layer, followed by drying. Thus, a solid electrolyte layer was formed. Then, the solid electrolyte layer was combined with a counter electrode such that a dye-sensitized solar cell was produced.

Example 3

A coating liquid C for forming an electrolyte layer was prepared in the manner used in Example 1 except that hydroxy propylmethylcellulose was used as the cellulose to be cationized or a derivative thereof. The coating liquid C was applied to a porous semiconductor layer, followed by drying. Thus, a solid electrolyte layer was formed. Then, the solid electrolyte layer was combined with a counter electrode such that a dye-sensitized solar cell was produced.

In this Example, a method for producing cationic hydroxy propylmethylcellulose is described as follows. First, hydroxy propylmethylcellulose (Shin-Etsu Chemical Co., Ltd.; 90SH-15,000; M.S. (degree of substituion of 3 OH groups of cellulose) for a hydroxy propyl group: 0.17; M.S. for a methyl group: 1.48; the viscosity of a 2% aqueous solution at 20° C.: 13,300 mPa·s) (200 g) was added to a reaction flask provided with a stirrer and a condenser. Then, t-butanol (2,000 g) was added thereto, followed by stirring for dispersion. Then, an aqueous solution prepared by dissolving sodium hydroxide (4.15 g) (0.1 mole per glucose unit of cellulose ether used as a raw material) in water (400 g) at room temperature was added thereto. Further, glycidyltrimethyl ammonium chloride (157.3 g) (1.0 mole per glucose unit of the same) was added thereto. Thereafter, the resultant was heated to 50° C., stirred for 5 hours, and neutralized with the addition of a 30% acetic acid solution (21.8 g). The reaction solution in the slurry form was cooled to room temperature and filtered. The thus obtained crude product was subjected to a step of washing via stirring in an acetone aqueous solution with an acetone-to-water ratio of 90:10 followed by filtration. This step was repeated four times. The product was dried in a vacuum dryer at 80° C. until a constant mass was achieved. Thus, 295 g of cationic hydroxy propylmethylcellulose was obtained.

Comparative Example 1

A coating liquid D for forming an electrolyte layer was prepared in the manner used in Example 1 except that ethylcellulose (non-ionic) was used instead of the cationic cellulose derivative (the concentration of ethylcellulose in the electrolyte solution: 15% by weight). The coating liquid D was applied using an applicator to a porous semiconductor layer so as to result in a thickness of 55 µm, followed by drying at 100° C. for 15 minutes. Thus, a solid electrolyte layer was formed. Then, the solid electrolyte layer was combined with a counter electrode such that a dye-sensitized solar cell was produced.

Comparative Example 2

A coating liquid E for forming an electrolyte layer was prepared in the manner used in Example 1 except that an anionic cellulose derivative (carboxymethylcellulose) was used instead of the cationic cellulose derivative. The coating liquid E was applied using an applicator to a glass substrate so as to result in a thickness of 55 µm, followed by volatilization at 120° C. on a hot plate for 15 minutes. As a result, the cellulose film was separated from the electrolyte and thus it was impossible to form a solid electrolyte.

(Thermostability Evaluation)

The above coating liquids A to D for forming an electrolyte layer were separately applied using an applicater to glass substrates so as to result in a thickness of 55 µm, followed by drying using a dryer. Thus, solid electrolyte layers A to D were formed. The solid electrolyte layers were placed on hotplates set to 120° C., 130° C., 140° C., and 150° C. for 30 minutes. Accordingly, it was confirmed that electrolyte solution components were not exuded from any of the solid electrolytes A to C. Meanwhile, it was confirmed that the electrolyte solution was exuded from the solid electrolyte D after heating at 120° C.

In addition, each of the coating liquids A to D was applied using an applicater to a 125-µm PET film so as to result in a thickness of 55 µm, followed by drying. Thus, solid electrolyte layers A to D were prepared. A 125-µm PET film was further applied to each of the solid electrolyte layers A to D to sandwich the solid electrolyate layer between PET films, followed by vacuum lamination at 150° C. As a result, it was confirmed that the electrolyte solution was not exuded from any of the solid electrolyte layers A to C.

(Evaluation of Power Generation Properties)

For evaluation of the produced cells, a solar simulator (light incidence intensity: 100 mW/cm$^2$) was used as a light source for light incidence from the side of the electrode base material having a porous semiconductor layer. Voltage was applied using a source measure unit (Keithley; Model 2400) to determine current-voltage characteristics. Thus, photo-electric conversion efficiency was obtained. Table 1 shows the results. In table 1, a double circle (⊚) denotes formation of a solid electrolyte as a result of application and drying of a coating liquid. The results shown in table 1 revealed that a dye-sensitized solar cell obtained with the use of cationic cellulose or a derivative thereof has sufficient power generation properties. In addition, the electrolyte solution was not exuded from the solar cell under high temperature and pressurized conditions. Therefore, the solar cell was found to have excellent thermostability. Further, in Examples 1 to 3, a sealing material for a solid electrolyte layer was not used, and thus production cost reduction could be achieved.

TABLE 1

|  | Solid electrolyte formation | Thermostability | Conversion efficiency (%) |
| --- | --- | --- | --- |
| Example 1 | ⊚ | Good for test of heating at 150° C. and lamination test | 4.52 |
| Example 2 | ⊚ | Good for test of heating at 150° C. and lamination test | 4.35 |
| Example 3 | ⊚ | Good for test of heating at 150° C. and lamination test | 4.21 |
| Comparative Example 1 | ⊚ | Heating at 120° C. caused an electrolyte solution to be exuded. | 5.20 |
| Comparative Example 2 | Solid-liquid separation | — | — |

Example 4

Preparation of a Coating Liquid for Forming a Solid Electrolyte

An electrolyte solution was prepared by dissolving hexylmethylimidazolium iodide (Tomiyama Pure Chemical Industries, Ltd.) (6 mol/l), iodine (Merck) (0.6 mol/l), N-methylbenzimidazole (Aldrich) (0.45 mol/l), and guanidium thiocyanate (Aldrich) (0.1 mol/l) in ethylmethylimidazoliumthiocyanate (Merck).

Subsequently, ethylcellulose (EC, 30 to 60 mPa·sec; Fluka) was dissolved in methanol (Junsei Chemical Co., Ltd.) so as to result in a concentration of 10% by weight. Thus, an EC solution was prepared. In addition, cationic hydroxy ethylcellulose (cationic HEC) was dissolved in methanol (Junsei Chemical Co., Ltd.) so as to result in a concentration of 5% by weight. Thus, a cationic HEC solution was prepared. Next, an electrolyte solution, an EC solution, and a cationic HEC solution were mixed at a weight ratio of 1:1.5:3, followed by stirring with a stirrer. Thus, a coating liquid for forming a solid electrolyte layer was prepared.

Preparation of an Electrode Base Material and a Porous Semiconductor Layer

Titanium oxide "P25" (5.65 g) (Nippon Aerosil Co., Ltd.) was introduced into ethanol (9.77 g). Acetylacetone (1.25 g) and zirconia beads (1.2 ϕ) were added thereto. The obtained mixed solution was stirred with a paint shaker. Thus, a titanium oxide paste was prepared. A chitosan derivative (10% methanol solution; Dainichiseika Color & Chemicals Mfg. Co., Ltd.) was added to the paste such that the proportion of the solid content of the titanium oxide paste accounted for by the derivative became 5 wt %. Thus, a coating liquid was obtained.

Subsequently, as an electrode base material, a transparent conductive film (113B-125N (TOBI); surface resistance: 13Ω/□; substrate size: 20 mm×20 mm) obtained by forming an ITO film on a polyethylene terephthalate film substrate was used. The above titanium oxide coating liquid was applied to the ITO film face by a doctor blade method, followed by drying at 150° C. for 5 minutes. Thus, a layer having a film thickness of 10 μm and comprising many metal oxide semiconductor particles (fine particles of $TiO_2$) was formed. Next, the above electrode base material on which the layer of metal oxide semiconductor particles had been formed was immersed in a coating liquid at room temperature for 20 hours, such coating liquid containing a dye obtained by dissolving, as a sensitized dye, ruthenium complex (Dyesol; N719) at a concentration of $3 \times 10^{-4}$ mol/l in a solution containing acetonitrile and tert-butyl alcohol at a volume ratio of 1:1. Then, the electrode base material was removed from the coating liquid containing a dye. A portion of the coating liquid adhering to the electrode base material was removed by washing using acetonitrile, followed by air drying. Thus, the sensitized dye was carried on the titanium oxide fine particle surfaces. Thereafter, the porous semiconductor layer was trimmed to a size of 10 mm×10 mm.

Cell Assembly

The above coating liquid for forming a solid electrolyte layer was applied to the obtained porous semiconductor layer formed on the electrode base material such that the size of coating area became 10 mm×10 mm, followed by drying with a dryer. Thus, a solid electrolyte layer with a thickness of approximately 20 μm was formed. Subsequently, as a counter electrode, a substrate having a size of 20 mm×20 mm formed on an ITO/PET film via sputtering of a Pt film was used. The counter electrode was attached to the above electrode base material on which an electrolyte layer and a porous semiconductor layer had been formed. Thus, a dye-sensitized solar cell was produced.

Example 5

A dye-sensitized solar cell was produced as in the case of Example 4 except that a coating liquid for forming a solid electrolyte layer was prepared by mixing an electrolyte solution, an EC solution, and a cationic HEC solution at a weight ratio of 1:1.5:2.

Example 6

A dye-sensitized solar cell was produced as in the case of Example 4 except that a coating liquid for forming a solid electrolyte layer was prepared by mixing an electrolyte solution, an EC solution, and a cationic HEC solution at a weight ratio of 1:1.5:1.

Comparative Example 3

A dye-sensitized solar cell was produced as in the case of Example 4 except that a coating liquid for forming a solid electrolyte layer was prepared by mixing an electrolyte solution, an EC solution, and a cationic HEC solution at a weight ratio of 1:1.5:0.

Example 7

A dye-sensitized solar cell was produced as in the case of Example 4 except that a coating liquid for forming a solid electrolyte layer was prepared by mixing an electrolyte solution, an EC solution, and a cationic HEC solution at a weight ratio of 1:0:3.

(Evaluation of Shape Stability of a Solid Electrolyte Layer)

Each of the coating liquids for forming an electrolyte layer prepared in Examples 4 to 7 and Comparative Example 3 was applied to a glass substrate, followed by drying. Thus, solid electrolyte layers each having a thickness of 20 μm were formed. The solid electrolyte layers were evaluated in terms of shape stability by detaching the solid electrolyte layer from each glass substrate with forceps. Table 2 shows the results. In the cases of Examples 4 to 6 and Comparative Example 3, the electrolyte layer was obtained in film form or in its original form when detached from the glass substrate (indicated by "◯" in table 2). In the case of Example 7, it was impossible to detach the solid electrolyte layer from the glass substrate or the solid electrolyte layer was in the adhesive gel form.

(Evaluation of Thermostability of a Solid Electrolyte Layer)

In the cases of Examples 4 to 7 and Comparative Example 3, each coating liquid for forming a solid electrolyte layer was applied to a glass plate, followed by drying. Thus, solid electrolyte layers each having a thickness of 20 μm were formed. Each glass plate on which a solid electrolyte layer had been formed was placed on a hot plate at 150° C. for 30 minutes for evaluation of thermostability. In the cases of Examples 4 to 7 and Comparative Example 3, each coating liquid for forming a solid electrolyte layer was also applied to a PET film in a similar manner, followed by drying. A PET film prepared as a counter base material was placed on each solid electrolyte layer so as to sandwich the solid electrolyte layer between the PET films, followed by heat lamination at 120° C. for evaluation of thermostability of the electrolyte layer. Table 2 shows the results. During testing, it was confirmed that the electrolyte solution was not exuded in the cases of Examples 4 to 7 (indicated by "◯" in table 2). Therefore, it was revealed that the solid electrolyte layer of the present invention has excellent thermostability. Particularly in the cases of Examples 4 to 6, as a result of the combined use of a resin other than cationic cellulose or a derivative thereof, it was possible to obtain an electrolyte layer having shape stability as well as thermostability.

(Evaluation of Power Generation Properties)

The dye-sensitized solar cells produced in Examples 4 to 7 and Comparative Example 3 were evaluated in terms of power generation properties. Specifically, a solar simulator (AM1.5; light incidence intensity: 100 mW/cm$^2$) was used as a light source for light incidence from the side of the electrode base material having a porous semiconductor layer to which a dye had been adsorbed. Voltage was applied using a source measure unit (Keithley; Model 2400) to determine current-voltage characteristics. Thus, photoelectric conversion efficiency was obtained. Table 2 shows the results. The results shown in table 2 revealed that the dye-sensitized solar cells each comprising a cationic cellulose derivative (Examples 4 to 7) were found to have sufficient power generation properties.

TABLE 2

| | Electrolyte: Ethyl C: Cationic C (weight ratio) | Shape stability of solid electrolyte layer | Thermostability | Power generation efficiency (%) |
|---|---|---|---|---|
| Example 4 | 1:1.5:3 | ◯ | ◯ | 2.11 |
| Example 5 | 1:1.5:2 | ◯ | ◯ | 2.17 |
| Example 6 | 1:1.5:1 | ◯ | ◯ | 2.24 |
| Comparative Example 3 | 1:1.5:0 | ◯ | × | 2.51 |
| Example 7 | 1:0:3 | × | ◯ | 2.32 |

REFERENCE SIGNS LIST

1: Dye-sensitized solar cell
10: Electrode base material
20: Porous semiconductor layer
30: Electrolyte layer
40: Counter electrode All publications, patents, and patent applications cited herein are incorporated herein by reference in their entirety.

The invention claimed is:

1. A dye-sensitized solar cell, comprising: an electrode base material; a porous semiconductor layer formed on the electrode base material having a porous surface carrying a sensitized dye; a counter electrode, which is disposed so as to face the porous semiconductor layer; and an electrolyte layer in the form of a solid comprising a redox pair and cationic cellulose or a derivative thereof having a covalent bond to cation portion of a cationization agent, which is formed between the electrode base material and the counter electrode, and wherein the concentration of the cationic cellulose or a derivative thereof in the electrolyte layer is 10% to 50% by weight.

2. The dye-sensitized solar cell according to claim 1, wherein the cationic cellulose or a derivative thereof is cationized hydroxy alkylcellulose.

3. The dye-sensitized solar cell according to claim 1, wherein the electrolyte layer further comprises ionic liquid.

4. A dye-sensitized solar cell module, which is obtained by connecting a plurality of the dye-sensitized solar cells according to claim 1 in series or in parallel.

5. A coating liquid used to form an electrolyte layer for a dye-sensitized solar cell, the coating liquid comprising a redox pair, cationic cellulose or a derivative thereof having a covalent bond to cation portion of a cationization agent, and water or an organic solvent, wherein the electrolyte layer is in the form of a solid and wherein the concentration of the cationic cellulose or a derivative thereof in the electrolyte layer is 10% to 50% by weight.

6. The coating liquid according to claim 5, wherein the cationic cellulose or a derivative thereof is canonized hydroxy alkylcellulose.

* * * * *